(12) United States Patent
Challberg

(10) Patent No.: US 6,813,327 B1
(45) Date of Patent: Nov. 2, 2004

(54) CORE SUPPORT FOR AN F-LATTICE CORE OF A BOILING WATER NUCLEAR REACTOR

(75) Inventor: Roy C. Challberg, Livermore, CA (US)

(73) Assignee: General Electric Company, Schenectady, NY (US)

( * ) Notice: Subject to any disclaimer, the term of this patent is extended or adjusted under 35 U.S.C. 154(b) by 6 days.

(21) Appl. No.: 09/692,135

(22) Filed: Oct. 19, 2000

(51) Int. Cl.[7] .............................................. G21C 15/06
(52) U.S. Cl. ...................... 376/362; 376/224; 376/327; 376/353; 376/352; 376/434; 376/438; 376/440; 376/448; 376/461; 376/462
(58) Field of Search ................. 376/224, 327, 376/353, 362, 352, 438, 434, 440, 448, 461, 462

(56) References Cited

U.S. PATENT DOCUMENTS

| | | | |
|---|---|---|---|
| 3,878,042 A | | 4/1975 | Curulla et al. ................. 176/78 |
| 3,888,732 A | * | 6/1975 | Berglund et al. ........... 376/224 |
| 4,544,522 A | | 10/1985 | Curulla et al. .............. 376/441 |
| 4,585,614 A | | 4/1986 | Helmersson ................ 376/434 |
| 4,767,595 A | * | 8/1988 | Wolters et al. .............. 376/267 |
| 4,904,443 A | * | 2/1990 | Carruth ....................... 376/233 |
| 5,267,286 A | * | 11/1993 | Hirukawa ................... 376/327 |
| 5,481,577 A | * | 1/1996 | Yates et al. ................. 376/310 |
| 5,519,746 A | * | 5/1996 | Dalke et al. ................ 376/434 |
| 5,524,031 A | * | 6/1996 | Kilian ......................... 376/261 |
| 5,875,222 A | * | 2/1999 | Thompson ................... 376/281 |
| 6,097,779 A | * | 8/2000 | Challberg et al. ........... 376/353 |
| 6,141,397 A | * | 10/2000 | Chaki et al. ................ 376/352 |

FOREIGN PATENT DOCUMENTS

| | | | |
|---|---|---|---|
| DE | 2245006 | * | 4/1973 |
| JP | 0019080 | * | 2/1979 |
| JP | 62-005197 | * | 7/1985 |
| JP | 6 1029-796 A | * | 2/1986 |
| JP | 6 1264289 | * | 11/1986 |
| JP | 6 2005197 | * | 1/1987 |
| JP | 2168195 | * | 6/1990 |

* cited by examiner

Primary Examiner—Michael J. Carone
Assistant Examiner—John Richardson
(74) Attorney, Agent, or Firm—Armstrong Teasdale LLP

(57) ABSTRACT

A core plate assembly for a nuclear reactor includes a plurality of support beams, a flat plate positioned on top of the support beams, a plurality of control rod guide tube openings arranged in staggered rows, and a plurality of fuel supports extending through the flat plate. Each guide tube opening has a cruciform shape defines four fuel bundle receiving areas. Each fuel support includes a coolant flow inlet, and a coolant flow outlet sized to receive a lower tie plate of a fuel bundle. The coolant flow inlet is offset from coolant flow outlet so that a centerline of the coolant flow inlet is parallel to a centerline of the coolant flow outlet. The coolant flow inlets are positioned adjacent a support beam, and the coolant flow outlets are positioned in a fuel bundle receiving area.

12 Claims, 8 Drawing Sheets

CORE SUPPORT FOR AN F-LATTICE CORE OF A BOILING WATER NUCLEAR REACTOR

BACKGROUND OF THE INVENTION

This invention relates generally to nuclear reactors and, more particularly, core support for F-lattice cores in nuclear reactors.

A known reactor pressure vessel (RPV) of a boiling water reactor (BWR) has a generally cylindrical shape and is closed at both ends, e.g., by a bottom head and a removable top head. A top guide is spaced above a core plate within the RPV. A core shroud, or shroud, surrounds the core plate and is supported by a shroud support structure. Particularly, the shroud has a generally cylindrical shape and surrounds both the core plate and the top guide. The top guide includes several openings, and fuel bundles are inserted through the openings and are supported by the core plate. The core plate includes a flat plate supported by a plurality of beams.

A plurality of openings are formed in the bottom head dome so that components, such as control rod drive assemblies, can extend within the RPV. As an example, for a control rod drive assembly, a control rod drive housing, for example, a tube, is inserted through the bottom head dome opening and a control rod drive is inserted through the control rod drive housing. The control rod drive is coupled to a control rod to position the control rod within the core.

A nuclear reactor core includes individual fuel assemblies that have different characteristics that affect the strategy for operation of the core. For example, a nuclear reactor core has many, e.g., several hundred, individual fuel bundles that have different characteristics. Such bundles preferably are arranged within the reactor core so that the interaction between the fuel bundles satisfies all regulatory and reactor design constraints, including governmental and customer specified constraints. In addition to satisfying the design constraints, since the core loading arrangement determines the cycle energy, i.e., the amount of energy that the reactor core generates before the core needs to be refreshed with new fuel elements, the core loading arrangement preferably optimizes the core cycle energy.

In order to furnish the required energy output, the reactor core is periodically refueled with fresh fuel bundles. To optimize core cycle energy, the higher reactivity bundles may be positioned at an inner core location. To satisfy some design constraints, however, higher reactivity bundles generally are positioned at an outer core location. The most depleted fuel bundles, i.e., the bundles with the least remaining energy content, are removed from the reactor. The interval between refuelings is referred to as a cycle of operation.

During the course of the cycle of operation, the excess reactivity, which defines the energy capability of the core, is controlled in two ways. Specifically, a burnable poison, e.g., gadoliia, is incorporated in the fresh fuel. The quantity of initial burnable poison is determined by design constraints typically set by the utility and by the NRC. The burnable poison controls most, but not all, of the excess reactivity.

Control rods also control the excess reactivity. Specifically, the reactor core contains control rods which assure safe shutdown and provide the primary mechanism for controlling the maximum power peaking factor. The total number of control rods available varies with core size and geometry, and is typically between 50 and 269. The position of the control rods, i.e., fully inserted, fully withdrawn, or somewhere between, is based on the need to control the excess reactivity and to meet other operational constraints, such as the maximum core power peaking factor.

One known control rod includes a central portion having four radially extending blades. The blades define four fuel bundle channels, and when inserting the control rod into the core, the control rod is positioned so that one fuel bundle is positioned within each channel. Therefore, for example, approximately 100 control rods are included in a reactor having 400 fuel bundles.

To reduce the number of control rods necessary for efficient operation, the core of a nuclear reactor includes a plurality of fuel bundles and a plurality of large control rods. Each large control rod is about two times the width of a conventional control rod and includes four control rod blades extending radially from a central portion and arranged at right angles to each other. The blades define four fuel bundle receiving channels. The core is configured so that the control rods are arranged in a plurality of staggered rows with four fuel bundles in each receiving channel. This configuration is defined as an F-lattice configuration.

In this F-lattice configuration a fuel cell is formed by one large control rod and sixteen fuel bundles. The four blades of the control rod divide the fuel cell into four equal quadrants. The fuel bundles are arranged around the control rod so that there are four fuel bundles in each quadrant of the fuel cell. The core is formed from a plurality of fuel cells. In the F-lattice configuration with the large control rods arranged in staggered rows, each edge of a fuel cell is adjacent to and substantially parallel to a blade of a control rod.

The large control rod in an F-lattice configuration complicates the flat plate and beam support concept of the core plate because of the size of the control rod and the staggered arrangement of the rods. The staggered rod pattern permits very little clearance for the support beams.

Normal coolant flow entering the standard sized BWR fuel assemblies is single phased and slightly subcooled. The flow approaches the fuel support vertically upward and then turns horizontally as the flow enters the inlet to the fuel support. The flow then passes through an orifice that provides the required pressure drop, assuring the correct coolant distribution to low and high-powered fuel bundles. The flow then turns vertical again and enters the lower tie plate of the fuel assembly, being distributed around the individual fuel pins.

For the F-lattice configuration, the flow approaches the entrance to the fuel vertically but must flow directly past core plate support beams for about half of the entrances. The support beams obstruct the coolant flow and create flow separation and bi-stable flow. These abnormal flow characteristics can influence the flow pattern at both the entrance and within the fuel assembly.

It would be desirable to provide a core support arrangement for F-lattice configured cores that provides identical flow entrance conditions for all the fuel assemblies.

BRIEF SUMMARY OF THE INVENTION

In an exemplary embodiment, a core plate assembly for a nuclear reactor includes a plurality of support beams, a flat plate positioned on top of the support beams, a plurality of control rod guide tube openings arranged in staggered rows, and a plurality of fuel supports extending through the flat plate.

The guide tube openings have a cruciform shape and include four slots extending radially from a central portion at right angles to each other. The slots define four fuel bundle receiving areas. Each guide tube opening is sized to receive a control rod guide tube.

Each fuel support includes a coolant flow inlet, a coolant flow outlet sized to receive a lower tie plate of a fuel bundle, and a coolant flow bore extending between the coolant flow inlet and the coolant flow outlet. The coolant flow inlet is offset from coolant flow outlet so that a centerline of the coolant flow inlet is parallel to a centerline of the coolant flow outlet. Each coolant flow inlet includes an orifice plate. The coolant flow inlets are positioned adjacent to a support beam, and the coolant flow outlets are positioned in a fuel bundle receiving area. Each fuel bundle receiving area includes four fuel supports to support four fuel bundles.

The above described core plate assembly provides unobstructed coolant flow inlets and therefore identical flow entrance conditions for all the fuel assemblies.

DETAILED DESCRIPTION OF THE INVENTION

Figure 1:
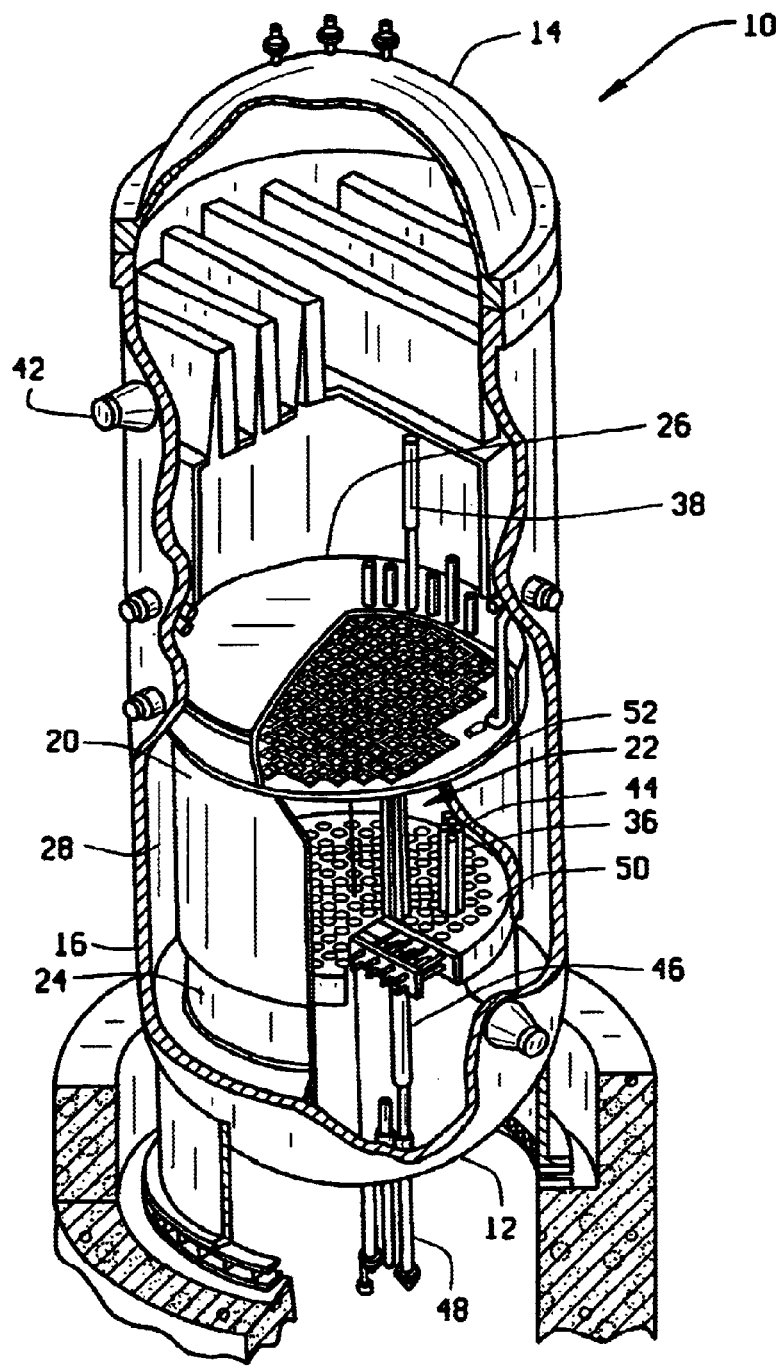
FIG. 1 is a sectional view, with parts cut away, of a boiling water nuclear reactor pressure vessel.

FIG. 1 is a sectional view, with parts cut away, of a boiling water nuclear reactor pressure vessel (RPV) 10. RPV 10 has a generally cylindrical shape and is closed at one end by a bottom head 12 and at its other end by a removable top head 14. A side wall 16 extends from bottom head 12 to top head 14. A cylindrically shaped core shroud 20 surrounds a reactor core 22. Shroud 20 is supported at one end by a shroud support 24 and includes a removable shroud head 26 at the other end. An annulus 28 is formed between shroud 20 and side wall 16.

Heat is generated within core 22, which includes fuel bundles 36 of fissionable material. Water circulated up through core 22 is at least partially converted to steam. Steam separators 38 separates steam from water, which is recirculated. Residual water is removed from the steam by steam dryers 40. The steam exits RPV 10 through a steam outlet 42 near vessel top head 14.

The amount of heat generated in core 22 is regulated by inserting and withdrawing control rods 44 of neutron absorbing material, such as for example, hafnium. To the extent that control rod 44 is inserted into fuel bundle 36, it absorbs neutrons that would otherwise be available to promote the chain reaction which generates heat in core 22. Control rod guide tubes 46 maintain the vertical motion of control rods 44 during insertion and withdrawal. Control rod drives 48 effect the insertion and withdrawal of control rods 44. Control rod drives 48 extend through bottom head 12.

Fuel bundles 36 are aligned by a core plate assembly 50 located at the base of core 22. A top guide 52 aligns fuel bundles 36 as they are lowered into core 22. Core plate 50 and top guide 52 are supported by core shroud 20. Fuel bundles 36 have a substantially square cross section. In alternative embodiments, fuel bundles can have a rectangular or other polygon cross section.

Figure 2:
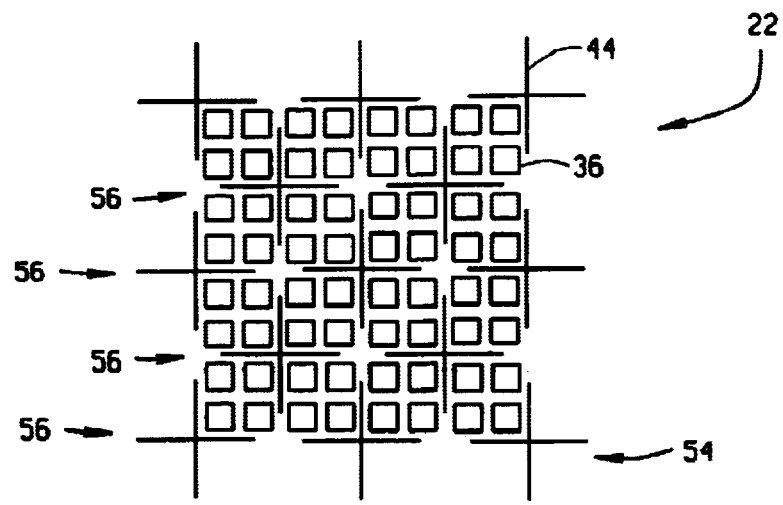
FIG. 2 is a top schematic view of an F-lattice core configuration for the reactor pressure vessel shown in FIG. 1.

FIG. 2 is a top schematic view of an F-lattice configuration of core 22 of reactor pressure vessel 10. Substantially standard size fuel bundles 36 and large control rods 44 are utilized in core 22. Each large control rod 44 is sized to provide poison control for sixteen conventional size fuel bundles 36. Conventional size fuel assemblies 36 and large control rods 44 are arranged in an F-lattice configuration 54 to facilitate minimizing the number of control rod drives and control rods. F-lattice configuration 54 has large control rods 44 in staggered rows 56 with sixteen conventional fuel bundles 36 surrounding each large control rod 44.

Figure 3:
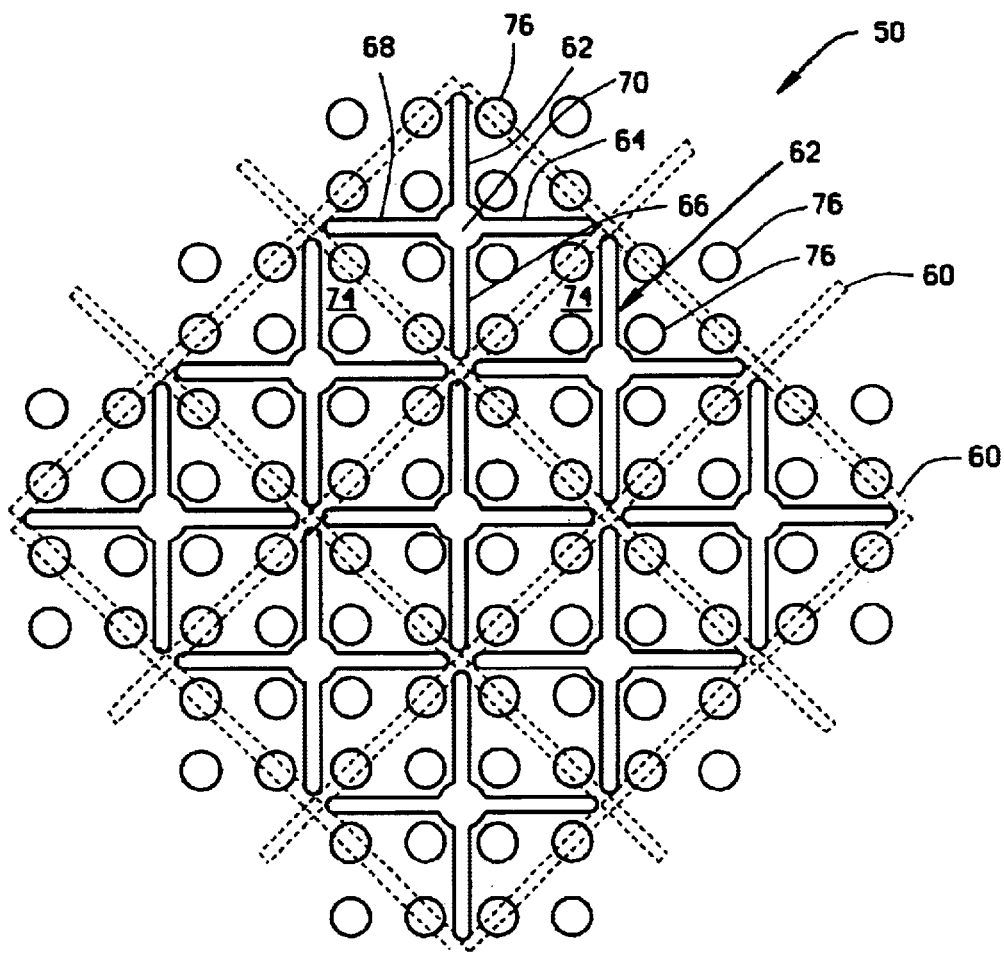
FIG. 3 is a top schematic view of a core plate for the F-lattice core configuration shown in FIG. 2.
Figure 4:
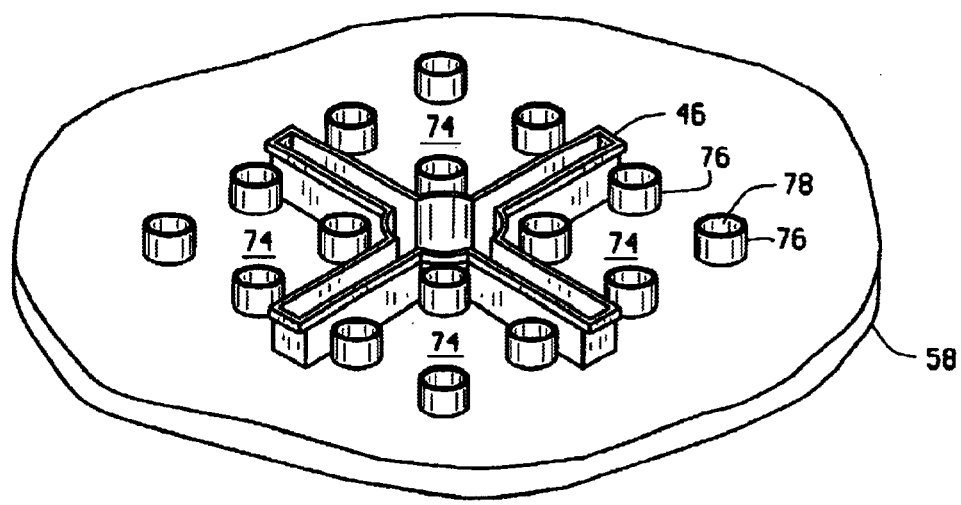
FIG. 4 is a sectional schematic view of the core plate shown in FIG. 3.

FIG. 3 is a top schematic view of core plate assembly 50 for F-lattice core configuration 54, and FIG. 4 is a top sectional schematic view of core plate assembly 50. Referring to FIGS. 3 and 4, core plate assembly 50 includes a flat plate 58 supported by a plurality of support beams 60. Flat plate 58 includes a plurality of control rod guide tube openings 62 sized to receive cruciform shaped control rod guide tubes 46. Each guide tube opening 62 has a cruciform shape and includes slots 64, 66, 68, and 70 extending radially from a central portion 72 at right angles to each other. Slots 64, 66, 68, and 70 define four fuel bundle receiving areas 74. Core plate assembly 50 also includes four fuel bundle supports 76 located in each fuel bundle receiving area 74. Each fuel bundle support 76 extends through flat plate 58 and includes a coolant flow outlet 78.

Figure 5:
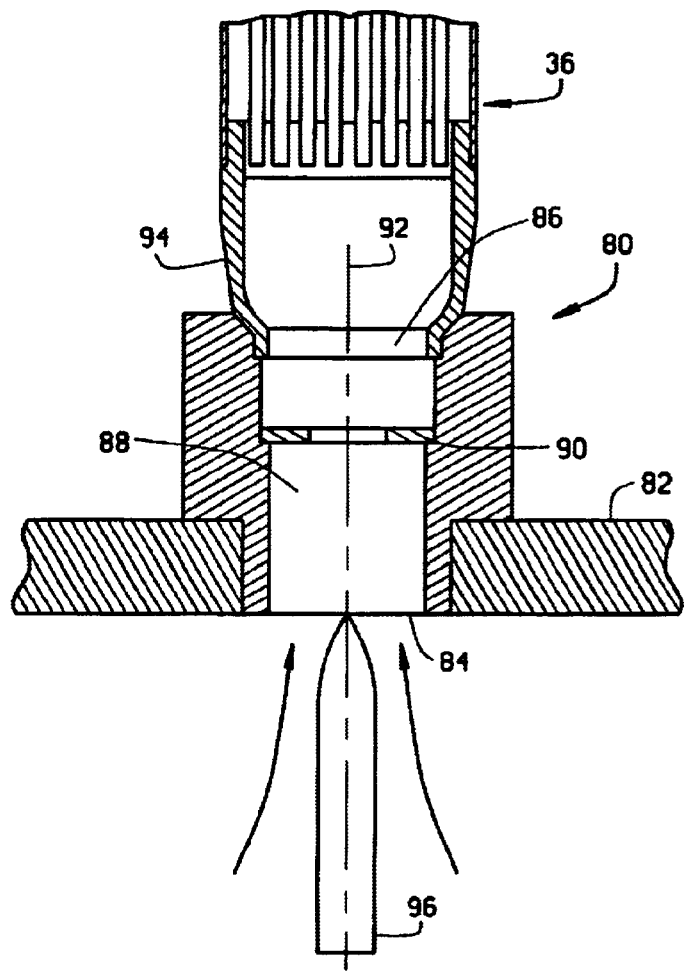
FIG. 5 is a sectional side view of a fuel bundle support.

FIG. 5 is a sectional side view of a known fuel bundle support 80 extending through a core plate 82. Fuel support 80 includes a coolant flow inlet 84 and a coolant flow outlet 86. A bore 88 extends from inlet 84 to outlet 86. An orifice plate 90 is located inside bore 88. Coolant flows into flow inlet 84, through bore 88 and flow outlet 86 and into fuel bundle 36. Coolant flow inlet 84 and coolant flow outlet 86 are coaxial and centerline 92 passes through the center of both inlet 84 and outlet 86. Coolant flow outlet 86 is configured to receive a lower tie plate 94 of a fuel bundle 36.

Because of the geometry of F-lattice core configuration 54, a core plate support beam 96 obstructs coolant flow inlet 84 of about 50% of fuel bundle supports 80 located on core plate 82. The obstruction of flow inlet 84 caused by support beam 96 can create flow separation and bi-stable flow which can influence the coolant flow pattern at both coolant flow inlet 84 and within fuel bundle 36.

Figure 6:
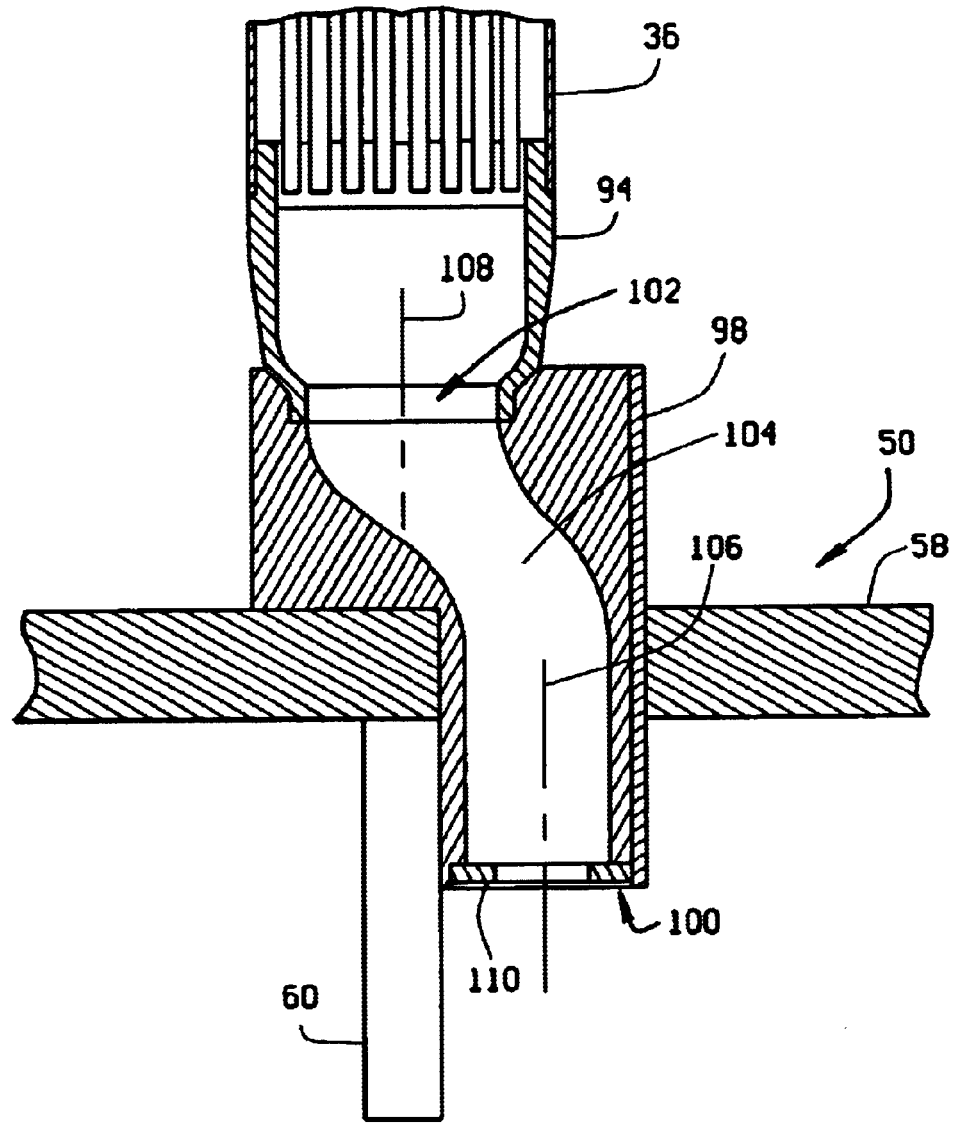
FIG. 6 is a sectional side view of a fuel bundle support in accordance with an embodiment of the present invention.

FIG. 6 is a sectional side view of a fuel bundle support 98, in accordance with an embodiment of the present invention, extending through flat plate 58 of core plate assembly 50. Fuel support 98 includes a coolant flow inlet 100, a coolant flow outlet 102 sized to receive lower tie plate 94 of a fuel bundle 36. A coolant flow bore 104 extends between coolant flow inlet 100 and coolant flow outlet 102. Coolant flow inlet 100 is offset from coolant flow outlet 102 so that a centerline 106 of coolant flow inlet 100 is parallel to a centerline 108 of coolant flow outlet 102. Coolant flow inlet 100 includes an orifice plate 110. Coolant flow inlet 100 is positioned adjacent to a support beam 60 of core plate assembly 50.

Figure 7:
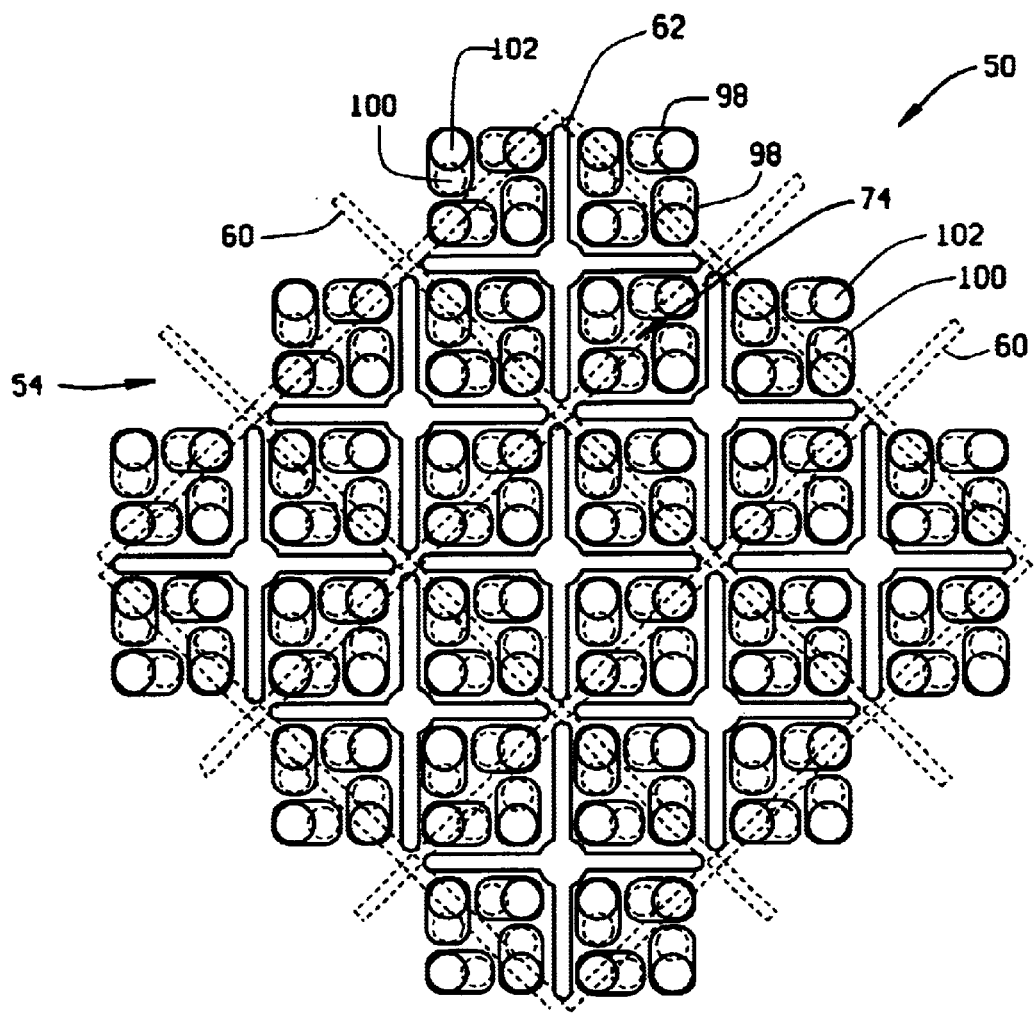
FIG. 7 is a top schematic view of a core plate including the fuel bundle support shown in FIG. 6.

FIG. 7 is a top schematic view of core plate assembly 50. Core plate assembly 50 includes a plurality of fuel bundle supports 98 and a plurality of cruciform shaped control rod guide tube openings 62 arranged in an F-lattice core configuration 54. Four fuel bundle supports 98 are located in each fuel bundle receiving area 74. Because of the offset configuration of coolant flow inlet 100 and coolant flow outlet 102 in fuel bundle supports 98, each coolant flow inlet 100 is positioned adjacent a core plate support beam 60, and therefore, there are no obstructions of coolant flow inlets 100.

Figure 8:
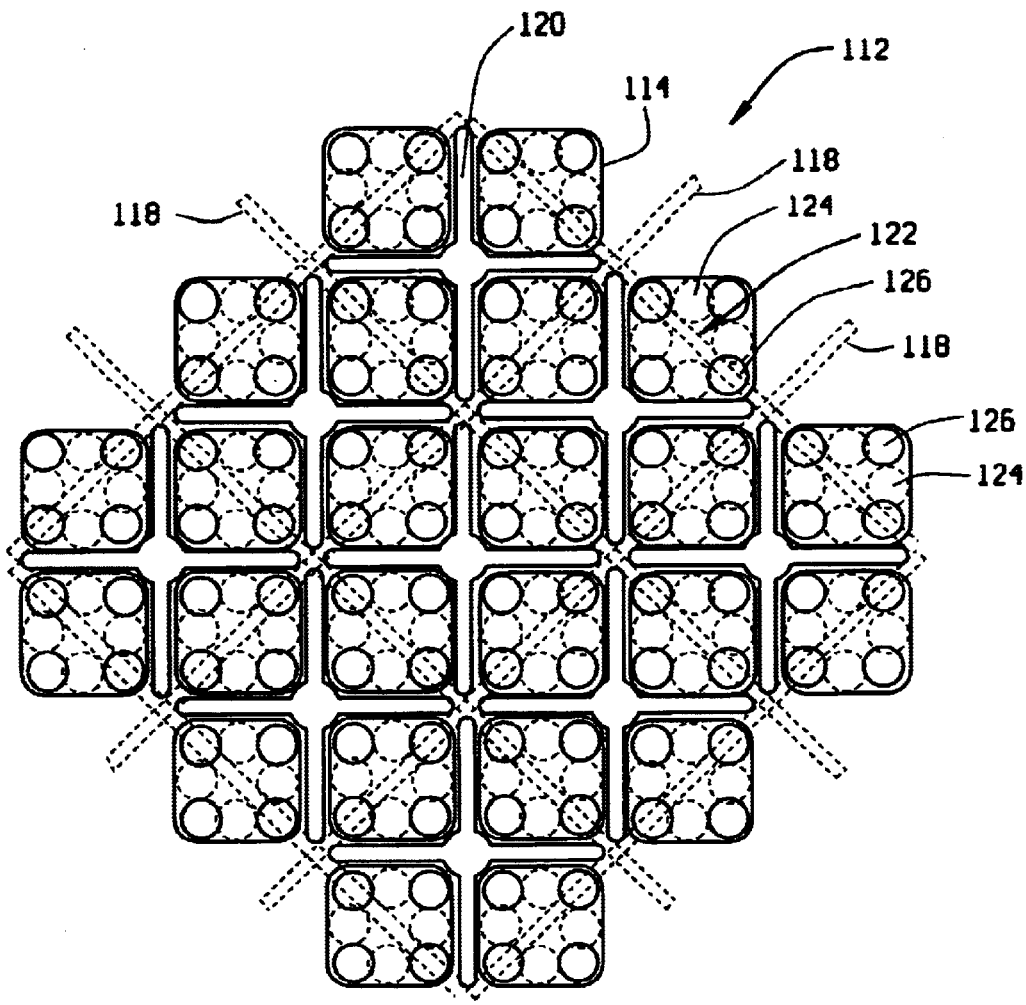
FIG. 8 is a top schematic view of a core plate including fuel bundle supports in accordance with another embodiment of the present invention.
Figure 9:
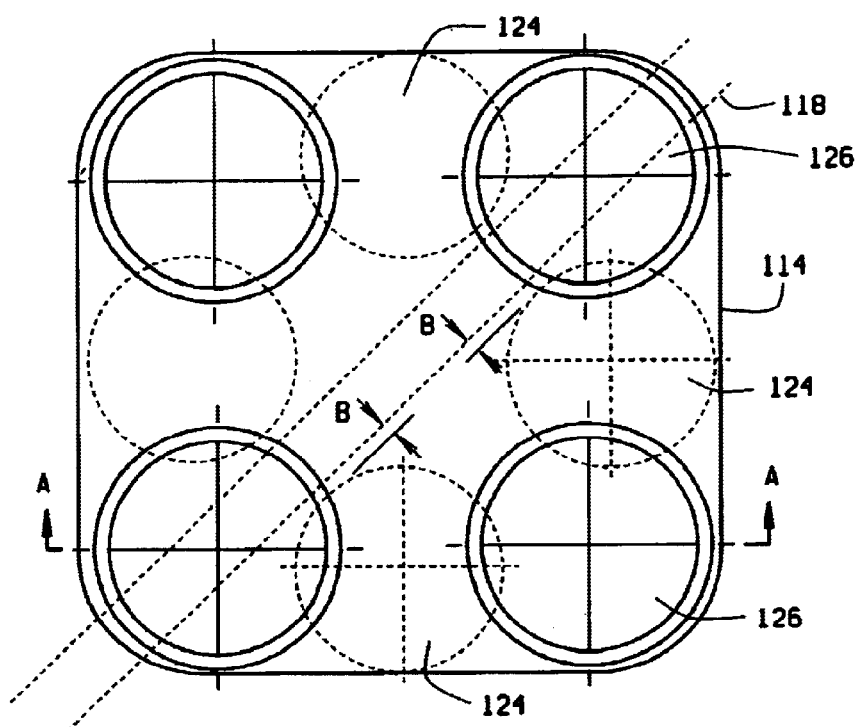
FIG. 9 is an enlarged top view of the fuel bundle support shown in FIG. 8.
Figure 10:
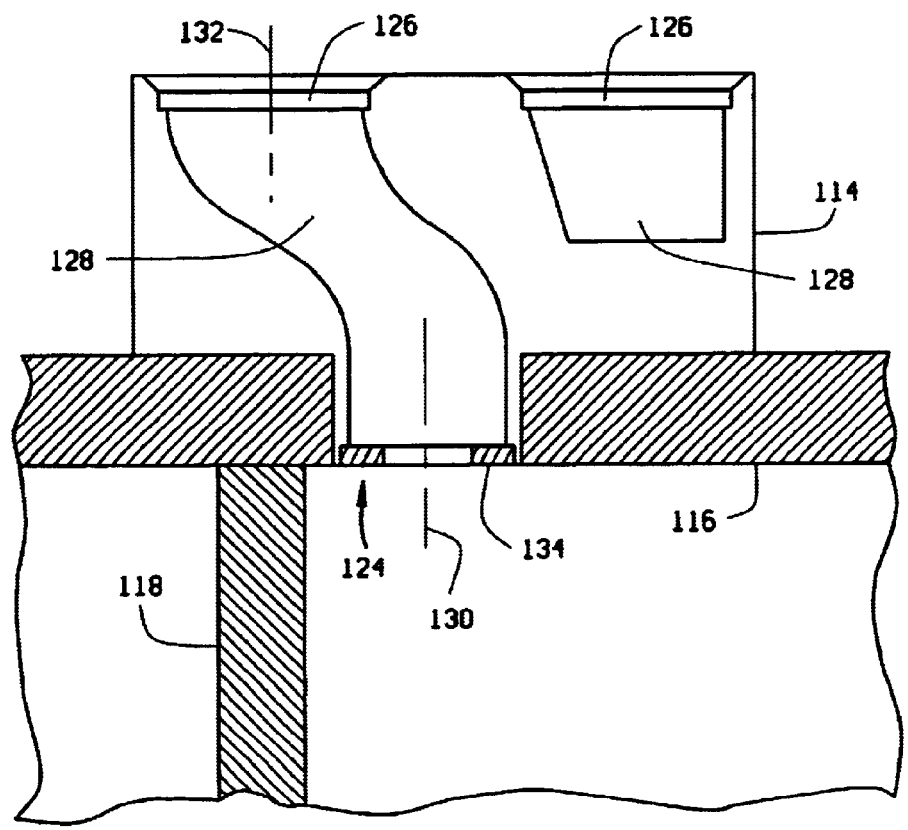
FIG. 10 is a cross sectional view through line A—A.

FIG. 8 is a top schematic view of a core plate assembly 112 that includes a plurality fuel bundle supports 114 in accordance with another embodiment of the present invention. FIG. 9 is an enlarged top view of fuel bundle support 114, and FIG. 10 is a cross sectional view of fuel bundle support 114 through line A—A. Core plate assembly 112, similar to core plate assembly 50 described above, includes a flat plate 116 supported by a plurality of support beams 118, a plurality of control rod guide tube openings 120, and a plurality of fuel bundle receiving areas 122.

Each fuel bundle support 114 supports four fuel bundles 36 (see FIG. 6) and includes four coolant flow inlets 124 and four coolant flow outlets 126. Each fuel bundle receiving area 122 contains one fuel bundle support 114.

Each coolant flow inlet 124 has a corresponding coolant flow outlet 126 and a bore 128 extending from coolant flow inlet 124 to corresponding coolant flow outlet 126. Coolant flow inlet 124 is offset from corresponding coolant flow outlet 126 so that a centerline 130 of coolant flow inlet 124 is parallel to a centerline 132 of corresponding coolant flow outlet 128. An orifice plate 134 is located in each coolant flow inlet 124. Additionally, coolant flow inlets 124 are located in fuel bundle support 114 so that each coolant flow inlet 124 is the same distance from a support beam 118. Particularly, a distance "B" from coolant flow inlet 124 is the same for all coolant flow inlets 124 in fuel bundle support 114.

The above described core plate assembly 50 with fuel bundle supports 98 and core plate assembly 112 with fuel supports 114 provide unobstructed coolant flow inlets and therefore identical flow entrance conditions for all fuel assemblies 36.

Figure 11:
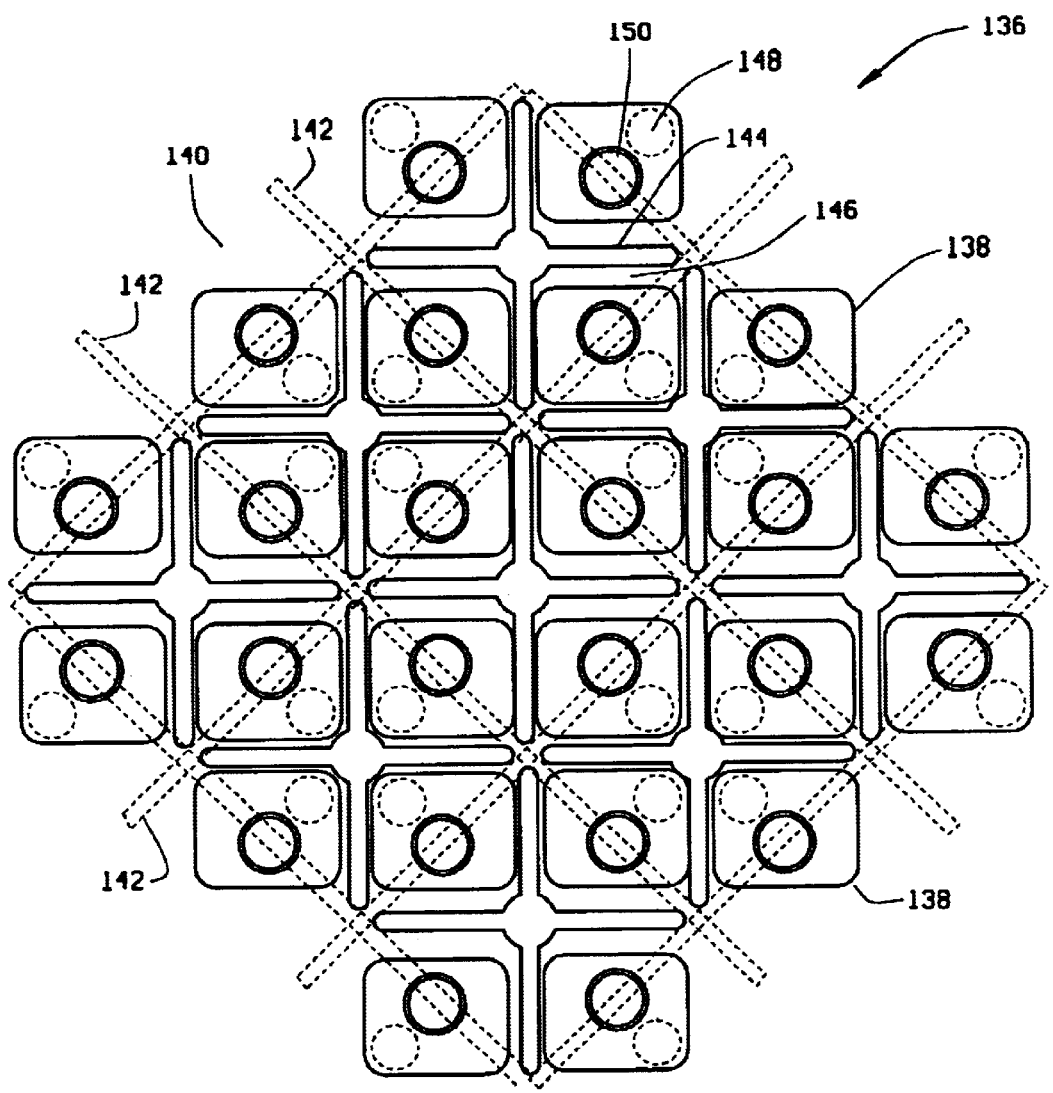
FIG. 11 is a top schematic view of a core plate including fuel bundle supports in accordance with another embodiment of the present invention.

FIG. 11 is a top schematic view of a core plate assembly 136 that includes a plurality fuel bundle supports 138 in accordance with another embodiment of the present invention. Core plate assembly 136, similar to core plate assembly 112 described above, includes a flat plate 140 supported by a plurality of support beams 142, a plurality of control rod guide tube openings 144, and a plurality of fuel bundle receiving areas 146. Each fuel bundle receiving area 146 includes one fuel bundle support 138, and each fuel bundle support is configured to support one large fuel bundle (not shown). Each large fuel bundle is approximately 1.5 times the size of a standard fuel bundle 36.

Fuel support 138 includes a coolant flow inlet 148 and a coolant flow outlet 150. A coolant flow bore (not shown) extends between coolant flow inlet 148 and coolant flow outlet 150. Coolant flow inlet 148 is offset from coolant flow outlet 150. Coolant flow inlet 148 is positioned adjacent to a support beam 142 of core plate assembly 136.

While the invention has been described in terms of various specific embodiments, those skilled in the art will recognize that the invention can be practiced with modification within the spirit and scope of the claims.

What is claimed is:

1. A core plate assembly for a nuclear reactor, the reactor comprising a plurality of large control rods, a plurality of cruciform shaped control rod guide tubes, and a plurality of fuel bundles having lower tie plates, said core plate assembly comprising:

a flat plate;

a plurality of support beams, said flat plate positioned on top of said support beams;

a plurality of control rod guide tube openings, each said guide tube opening sized to receive a control rod guide tube, said control rod guide tube openings arranged in staggered rows, said guide tube openings having a cruciform shape and comprising four slots extending radially from a central portion at right angles to each other, said slots defining four fuel bundle receiving areas;

a plurality of fuel supports extending through said flat plate, each said fuel support comprising:

a coolant flow inlet, said coolant flow inlet positioned adjacent a support beam;

a coolant flow outlet sized to receive a lower tie plate of a fuel bundle, said coolant flow outlet positioned in a fuel bundle receiving area; and a coolant flow bore extending between said coolant flow inlet and said coolant flow outlet, said coolant flow inlet offset from said coolant flow outlet so that a centerline of said coolant flow inlet is parallel to a centerline of said coolant flow outlet.

2. A core plate assembly in accordance with claim 1 wherein each said coolant flow inlet comprises an orifice plate.

3. A core plate assembly in accordance with claim 1 wherein each said fuel bundle receiving area comprises four fuel supports.

4. A core plate assembly in accordance with claim 1 wherein each said fuel bundle receiving area comprises one fuel support.

5. A core plate assembly in accordance with claim 1 wherein each fuel support further comprises:

four coolant flow inlets;

four coolant flow outlets sized to receive a lower tie plate of a fuel bundle; and four coolant flow bores, each flow bore extending between a corresponding coolant flow inlet and a corresponding coolant flow outlet, said coolant flow inlets offset from said corresponding coolant flow outlets so that a centerline of said coolant flow inlet is parallel to a centerline of said corresponding coolant flow outlet, said coolant flow inlets positioned adjacent a support beam, and said coolant flow outlets positioned in a fuel bundle receiving area.

6. A core plate assembly in accordance with claim 5 wherein each said fuel bundle receiving area comprises one fuel support.

7. A core for a nuclear reactor comprising:

a plurality of fuel bundles, each fuel bundle comprising a lower tie plate;

a plurality of cruciform shaped large control rods;

a plurality of cruciform shaped control rod guide tubes; and a core plate assembly comprising:

a flat plate;

a plurality of support beams, said flat plate positioned on top of said support beams;

a plurality of control rod guide tube openings, each said guide tube opening sized to receive a control rod guide tube, said control rod guide tube openings arranged in staggered rows, said guide tube openings having a cruciform shape and comprising four slots extending radially from a central portion at right angles to each other, said slots defining four fuel bundle receiving areas; and a plurality of fuel supports extending through said flat plate, each said fuel support comprising:

a coolant flow inlet, said coolant flow inlet positioned adjacent a support beam;

a coolant flow outlet sized to receive a lower tie plate of a fuel bundle, said coolant flow outlet positioned in a fuel bundle receiving area; and a coolant flow bore extending between said coolant flow inlet and said coolant flow outlet, said coolant flow inlet offset from said coolant flow outlet so that a centerline of said coolant flow inlet is parallel to a centerline of said coolant flow outlet.

8. A core in accordance with claim 7 wherein each said coolant flow inlet comprises an orifice plate.

9. A core in accordance with claim 7 wherein each said fuel bundle receiving area comprises four fuel supports.

10. A core in accordance with claim 7 wherein each said fuel bundle receiving area comprises one fuel support.

11. A core in accordance with claim 7 wherein each fuel support further comprises:

four coolant flow inlets;

four coolant flow outlets sized to receive a lower tie plate of a fuel bundle; and four coolant flow bores, each flow bore extending between a corresponding coolant flow inlet and a corresponding coolant flow outlet, said coolant flow inlets offset from said corresponding coolant flow outlets so that a centerline of said coolant flow inlet is parallel to a centerline of said corresponding coolant flow outlet, said coolant flow inlets positioned adjacent a support beam, and said coolant flow outlets positioned in a fuel bundle receiving area.

12. A core in accordance with claim 11 wherein each said fuel bundle receiving area comprises one fuel support.

* * * * *